(12) United States Patent
McGowan

(10) Patent No.: US 6,584,104 B1
(45) Date of Patent: Jun. 24, 2003

(54) LOST-PACKET REPLACEMENT FOR A DIGITAL VOICE SIGNAL

(75) Inventor: James William McGowan, Howell, NJ (US)

(73) Assignee: Lucent Technologies, Inc., Murray, NJ (US)

(*) Notice: Subject to any disclaimer, the term of this patent is extended or adjusted under 35 U.S.C. 154(b) by 0 days.

(21) Appl. No.: 09/347,462

(22) Filed: Jul. 6, 1999

(51) Int. Cl.[7] .............................................. H04L 12/56
(52) U.S. Cl. ...................................... 370/394; 370/528
(58) Field of Search ................................ 370/394, 230, 370/474, 229, 231, 232, 235, 236, 390, 389, 524, 528, 527, 465, 489, 395.1, 529, 216, 503, 514, 512, 513, 509, 510, 441, 342; 714/748, 749; 375/242, 246, 253, 145, 137, 134, 142, 143, 149

(56) References Cited

U.S. PATENT DOCUMENTS 6,381,215 B1 * 4/2002 Hamilton et al. ........... 370/236
6,392,993 B1 * 5/2002 Hamilton et al. ........... 370/230

* cited by examiner

*Primary Examiner*—Dang Ton

(57) ABSTRACT

An apparatus, method, and computer program product for replacing a lost packet in a sequence of packets, where each packet including samples of a signal, preferably a voice signal. The method includes the steps of generating a fill packet, selecting from a packet that is adjacent to the lost packet a portion that is adjacent to the lost packet, selecting from the fill packet a portion that is adjacent to the adjacent packet, and replacing the selected portion of the fill packet with a weighted average of the selected portion of the fill packet and a reflection of the selected portion of the adjacent packet.

30 Claims, 21 Drawing Sheets

Computer System 200

LOST-PACKET REPLACEMENT FOR A DIGITAL VOICE SIGNAL

BACKGROUND OF THE INVENTION

1. Field of the Invention

The present invention relates generally to digital telephony, and more particularly to replacing lost packets in a digital voice signal.

2. Related Art

Digital voice is typically coded as a series of numerical values called samples. In Pulse Code Modulation (PCM) coding, these samples represent the amplitude of the speech signal at a given moment in time. Both data networks based on Internet Protocol (IP) and Asynchronous Transfer Mode (ATM) networks store digital voice as collections of samples called packets.

A packet is simply a sequential string of samples attached to a header. The header indicates, among other things, an ordinal number for the packet. FIG. 3 depicts a voice signal that has been digitized and coded as samples which are grouped into three sequential packets 302, 304 and 306. Packets can be any size, but remain a fixed size throughout a transmission. Here, packets would be 4 msec in length for speech sampled at 8 kHz.

Currently, networks that deliver voice, data and video do so by first portioning the information into multiple packets and transmitting them across a network. Each packet may take an entirely different route through the network. At the receiving end of the transmission, the packets must use be reassembled into proper order. For voice applications, packets must be encoded, transmitted, received, and reassembled in real-time. This real-time requirement often means that sophisticated voice coding techniques cannot be performed. Therefore, a need has arisen to develop processes to handle end-to-end voice communications in real-time.

One difficulty with Voice over IP (VoIP) applications is that IP does not guarantee that packets will arrive at the receiving end within any specified period of time, if at all. The receiving end, therefore, must be able to handle the situation where there are lost packets in the signal.

SUMMARY OF THE INVENTION

The present invention is an apparatus, method, and computer program product for replacing a lost packet in a sequence of packets, where each packet including samples of a signal, preferably a voice signal.

According to one embodiment, the method includes the steps of generating a fill packet, selecting from a packet that is adjacent to the lost packet a portion that is adjacent to the lost packet, selecting from the fill packet a portion that is adjacent to the adjacent packet, and replacing the selected portion of the fill packet with a weighted average of the selected portion of the fill packet and a reflection of the selected portion of the adjacent packet.

According to another embodiment, the method includes the steps of generating a fill packet, selecting from a packet that is adjacent to the lost packet a portion that is adjacent to the lost packet, selecting from the fill packet a portion that is adjacent to the adjacent packet, and replacing the selected portion of the adjacent packet with a weighted average of the selected portion of the adjacent packet and a reflection of the selected portion of the fill packet.

In either embodiment, the adjacent packet may precede or follow the lost packet, and the weighting may be according to a linear function, a cumulative probability density function, or other types of weighting functions.

One advantage of the present invention is that it replaces lost packets in a voice signal without noticeably degrading sound quality.

One advantage of the present invention is that it is computationally simple.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

FIG. 22 depicts a signal where a lost packet has been modified using packet replacement and front and back substitution.

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

Currently, there are two broad classes of solutions to the problem of lost packets. One class of solutions deals entirely with the case in which voice has been coded by some type of predictive coder-decoder (codec), such as the ITU recommended G.729a. For codecs that use prediction, both the transmitting end and the receiving end use the same process to guess at the contents of a packet based on the contents of previous packets. Then, only the difference between the actual packet and the prediction is transmitted. When a packet fails to be received, the prediction itself can be played.

The drawback to codecs is that they require processing resources that are not always available over an IP-based network, as well as precious processing time that may add to transmission delays that users find unacceptable.

The second class of solutions to the problem of lost packets addresses situations in which the use of a codec is prohibitive. In such cases, the ITU standard G.711 is typically used to code the voice. (G.711 is simply PCM coding that specifies that voice be sampled with 8 bytes of resolution, 8000 samples per second.) In this class of solutions, there are two processes in general use. Both processes take very little computational resources, with one taking slightly more than the other.

Figure 4:
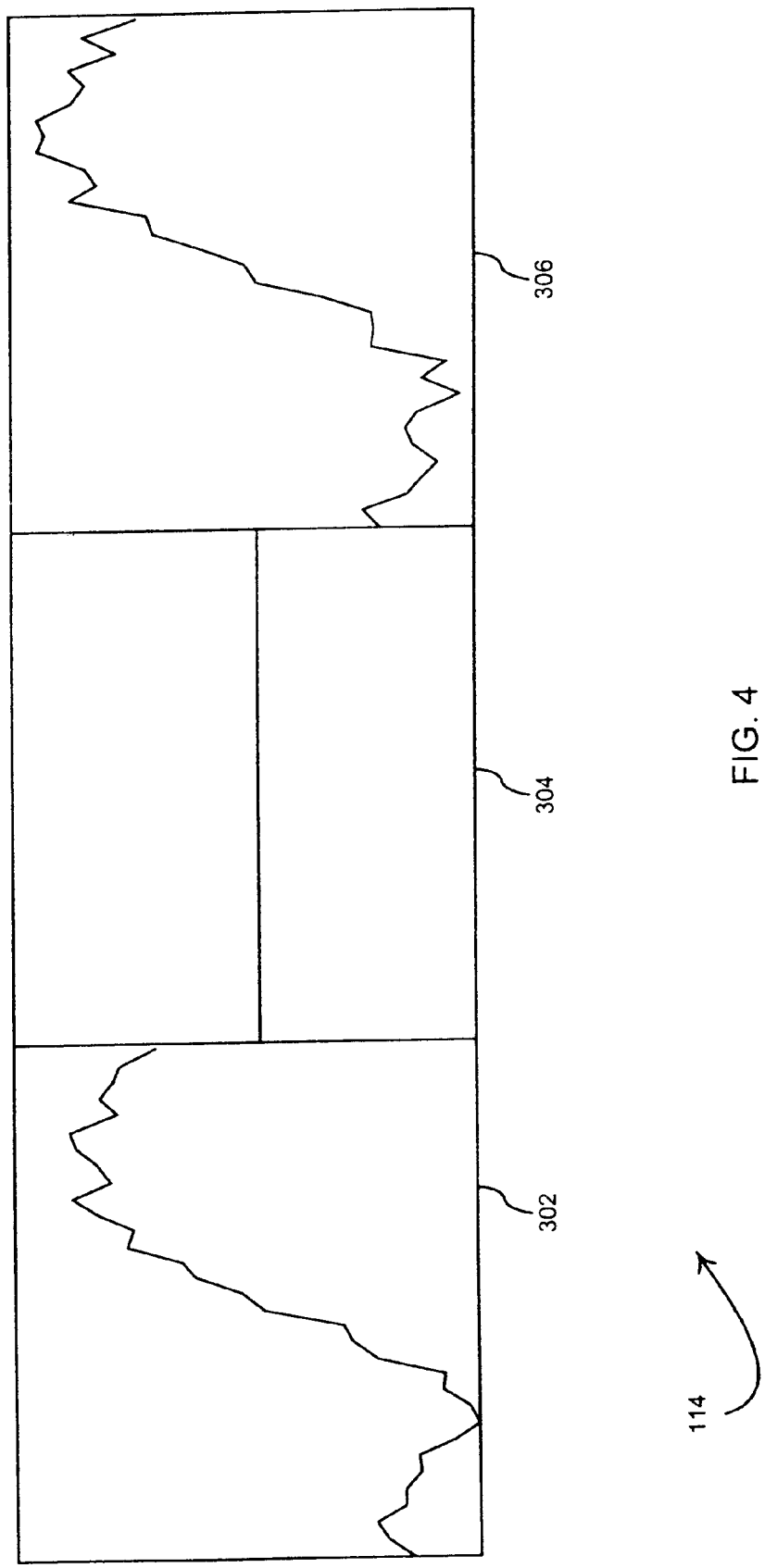
FIG. 4 depicts a packet replacement process known as zero stuffing.

The first process is called zero stuffing, and is depicted in FIG. 4. Values for PCM samples can be both positive and negative. Zero stuffing simply inserts the value 0 for every missing sample in the lost packet. This solution creates audible clicks for short packets, and audible clicks and gaps for longer packets. However, it takes a minimum of computational resources. Referring to FIG. 4, packet 304 has been lost, and has been replaced by zero-stuffing.

Figure 5:
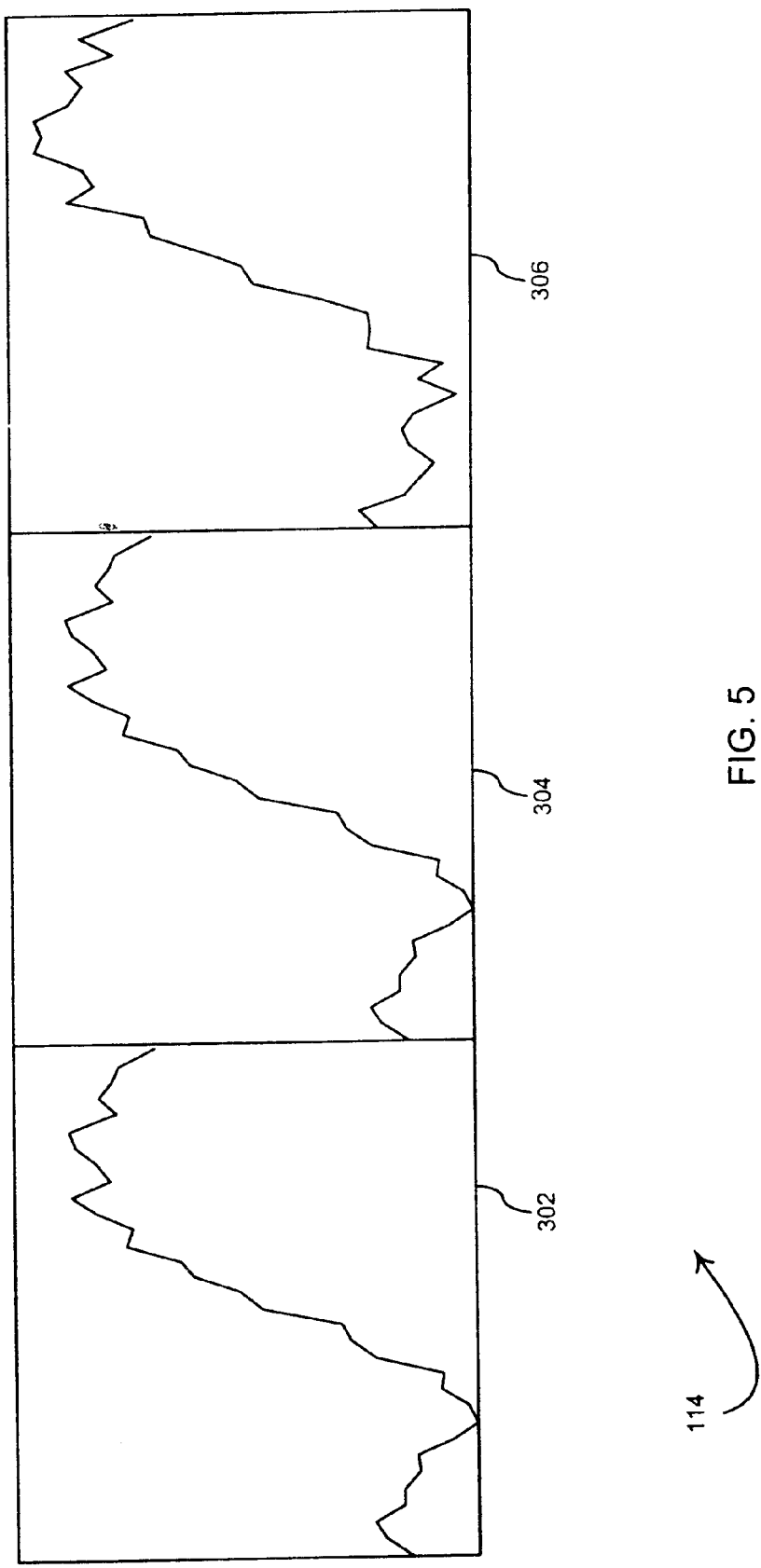
FIG. 5 depicts a packet replacement process known as packet repeating.

The second process is called packet repeating, and is shown in FIG. 5. When a packet is lost, the previous packet is simply repeated. If two packets in a row are lost, the packet is repeated again. The amplitude of the repeated packet may be scaled so that it plays back at some fraction of its original amplitude. This solution creates the same audible clicks as zero stuffing. It takes a small amount of time to execute this process, and it only requires a single additional packet remain in memory, relative to zero-stuffing. Referring to FIG. 5, packet 304 has been lost, and has been replaced by packet repeating.

The process of the present invention often eliminates or significantly reduces the audible click that both the previous processes produce. The process can be implemented in multiple ways, depending on the availability of arriving packets and computational resources. Computational components of the method will be described, followed by methods of combining the components.

There are two components to the full implementation. Either component can be used independently of the other. In addition, the two components can be used together. In each component, the lost packet is first replaced by a replacement packet using conventional methods such as zero-stuffing or packet repeating. Then, a portion of the replacement packet, or of an adjacent packet, is modified to remove signal discontinuities.

The first component is referred to herein as "front substitution", in which the initial portion of a replacement packet is produced in such a way as to blend with the end of the previous packet. Since voice tends to vary slowly relative to the sampling rate of the PCM coding, the first sample of one packet tends to be in some small neighborhood surrounding the last sample of the previous packet. Conventional packet replacement methods often place the beginning of one sample far from the ending of the last, producing large signal discontinuities (refer to the packet boundaries in FIGS. 4 and 5). A large signal discontinuity produces an audible click that is annoying to a listener.

This argument can be extend to argue that ideally one wants to maintain continuity not between these two samples only, but across all frequencies represented in the previous packet. The present invention addresses this more complex argument while maintaining computational simplicity by employing a group of samples from the previous packet to reconstruct a group of samples from the lost packet.

The second component is referred to herein as "back substitution." Back substitution is accomplished by reconstructing the ending samples of the missing packet by looking ahead to the next packet. Back substitution is similar to front substitution, as discussed below. Back substitution requires that the packet following the missing packet has arrived, and has been loaded into memory. When more than one consecutive packet is lost, the last correctly received packet may be used. When accessing the next packet is not possible or inadvisable, post-front substitution, described below, may be used.

Exemplary Voice Processing System

Figure 1:
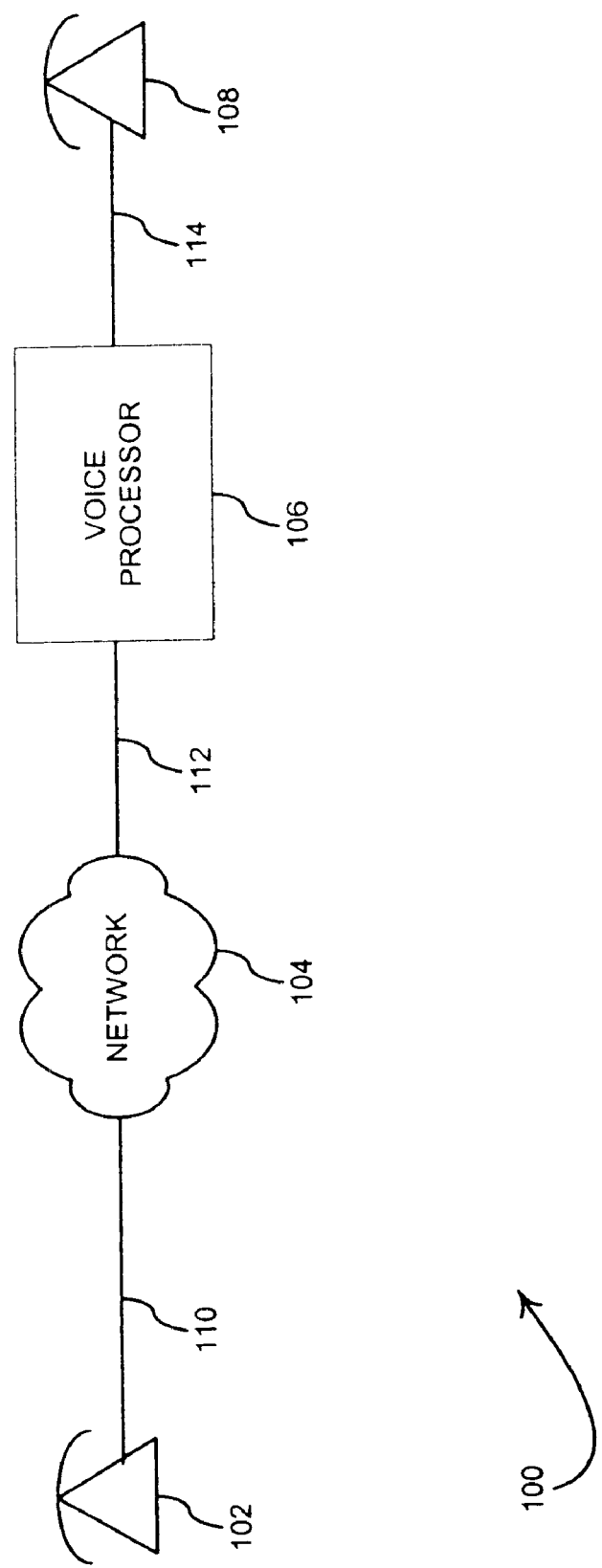
FIG. 1 depicts a digital voice transmission system in which the present invention is useful.

FIG. 1 depicts a digital voice transmission system 100 in which the present invention is useful. System 100 includes two voice terminals 102 and 108. Voice terminals 102 and 108 can be implemented as telephones or the like. Voice terminals 102 and 108 are interconnected by a network 104. Network 104 can be implemented as the Internet, for example. Interposed between network 104 and voice terminal 108 is a voice processor 106.

In the example of FIG. 1, voice terminal 102 transmits a voice signal 110 that is intended for voice terminal 108. Voice signal 110 traverses network 104 as a digital packetized signal. In this example, at least one voice packet is lost during traversal of network 104, so that the voice signal 112 that emerges from network 104 is missing at least one voice packet.

In this example, the present invention is implemented within voice processor 106. Voice processor 106 receives voice signal 112 and replaces the lost packets to produce reconstructed voice signal 114, which is supplied to voice terminal 108.

Figure 2:
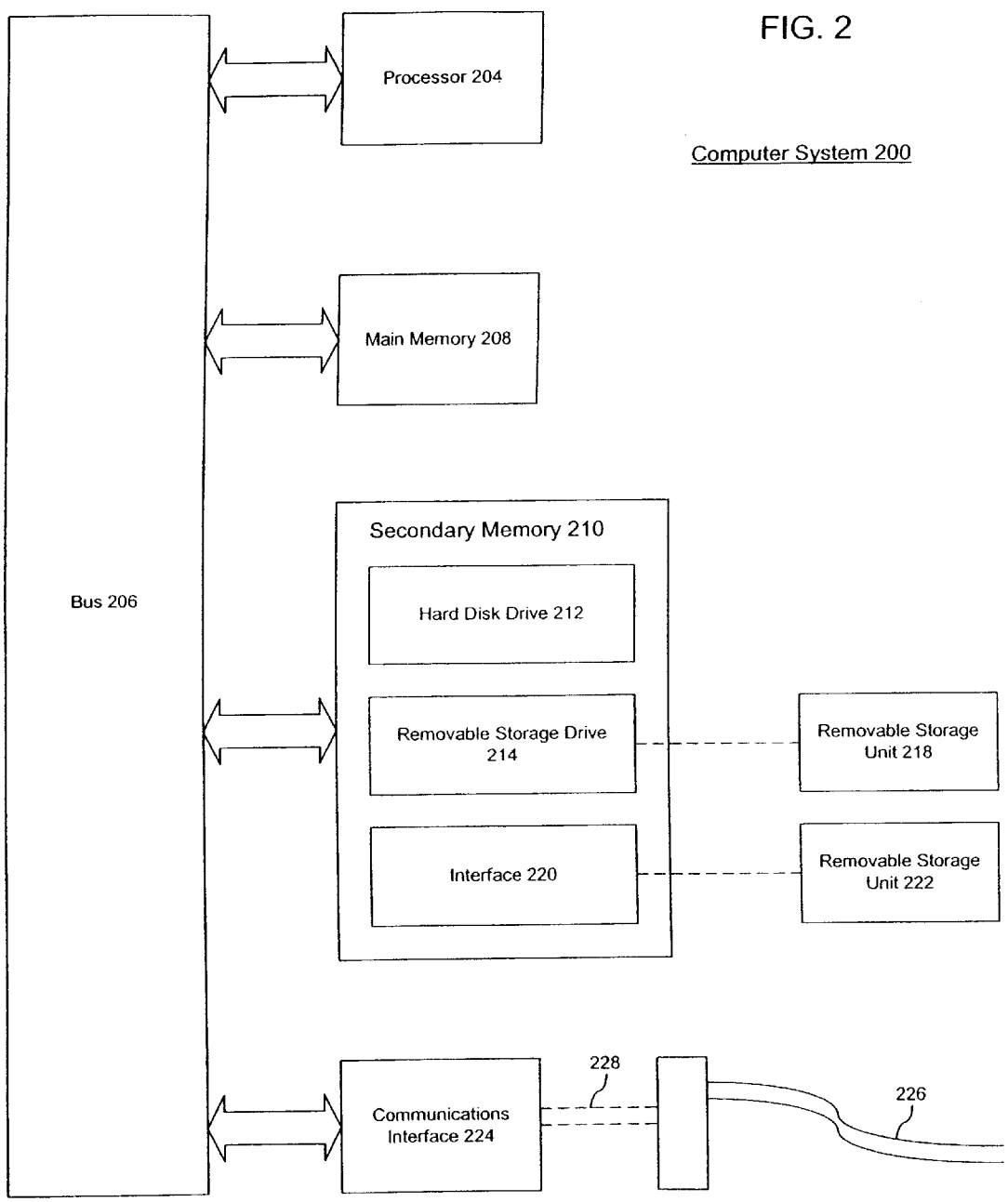
FIG. 2 depicts an example computer system is shown in which the present invention can be implemented.

The present invention may be implemented using hardware, software or a combination thereof and may be implemented in a computer system or other processing system. In fact, in one embodiment, the invention is directed toward one or more computer systems capable of carrying out the functionality described herein. An example computer system 200 is shown in FIG. 2. The computer system 200 includes one or more processors, such as processor 204. The processor 204 is connected to a communication bus 206. Various software embodiments are described in terms of this example computer system. After reading this description, it will become apparent to a person skilled in the relevant art how to implement the invention using other computer systems and/or computer architectures.

Computer system 200 also includes a main memory 208, preferably random access memory (RAM), and can also include a secondary memory 210. The secondary memory 210 can include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc. which is read by and written to by removable storage drive 214. As will be appreciated, the removable storage unit 218 includes a computer usable storage medium having stored therein computer software and/or data.

In alternative embodiments, secondary memory 210 may include other similar means for allowing computer programs or other instructions to be loaded into computer system 200. Such means can include, for example, a removable storage unit 222 and an interface 220. Examples of such include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 218 to computer system 200.

Computer system 200 can also include a communications interface 224. Communications interface 224 allows software and data to be transferred between computer system 200 and external devices. Examples of communications interface 224 can include a modem, a network interface (such as an Ethernet card), a communications port, a PCM-CIA slot and card, etc. Software and data transferred via communications interface 224 are in the form of signals which can be electronic, electromagnetic, optical or other signals capable of being received by communications interface 224. These signals 226 are provided to communications interface 224 via a channel 228. This channel 228 carries signals 226 and can be implemented using wire or cable, fiber optics, a phone line, a cellular phone link, an RF link and other communications channels.

In this document, the terms "computer program medium" and "computer usable medium" are used to generally refer to media such as removable storage device 218, a hard disk installed in hard disk drive 212, and signals 226. These computer program products are means for providing software to computer system 200.

Computer programs (also called computer control logic) are stored in main memory 208 and/or secondary memory 210. Computer programs can also be received via communications interface 224. Such computer programs, when executed, enable the computer system 200 to perform the features of the present invention as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212 or communications interface 224. The control logic (software), when executed by the processor 204, causes the processor 204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Front Substitution

Figure 6:
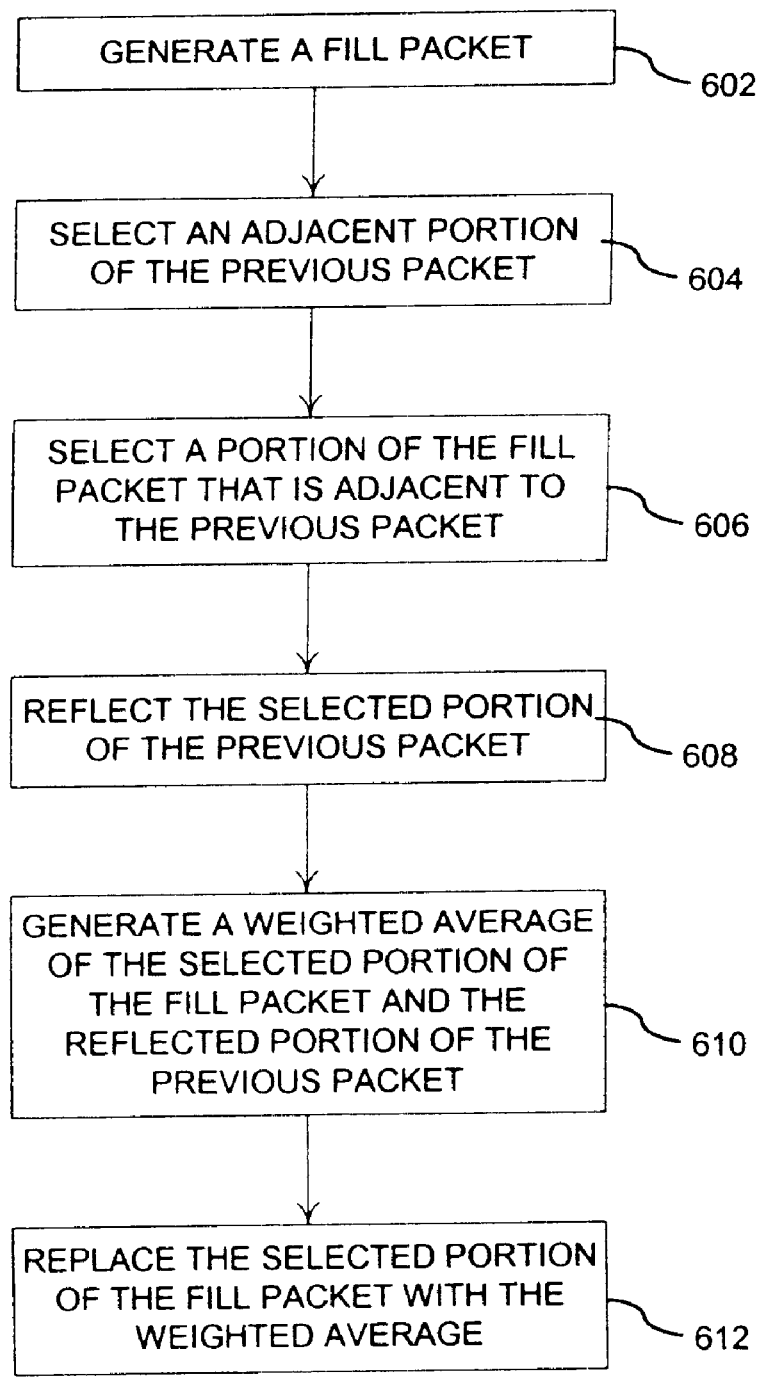
FIG. 6 is a flowchart depicting the operation of the present invention in executing front substitution.
Figure 7:
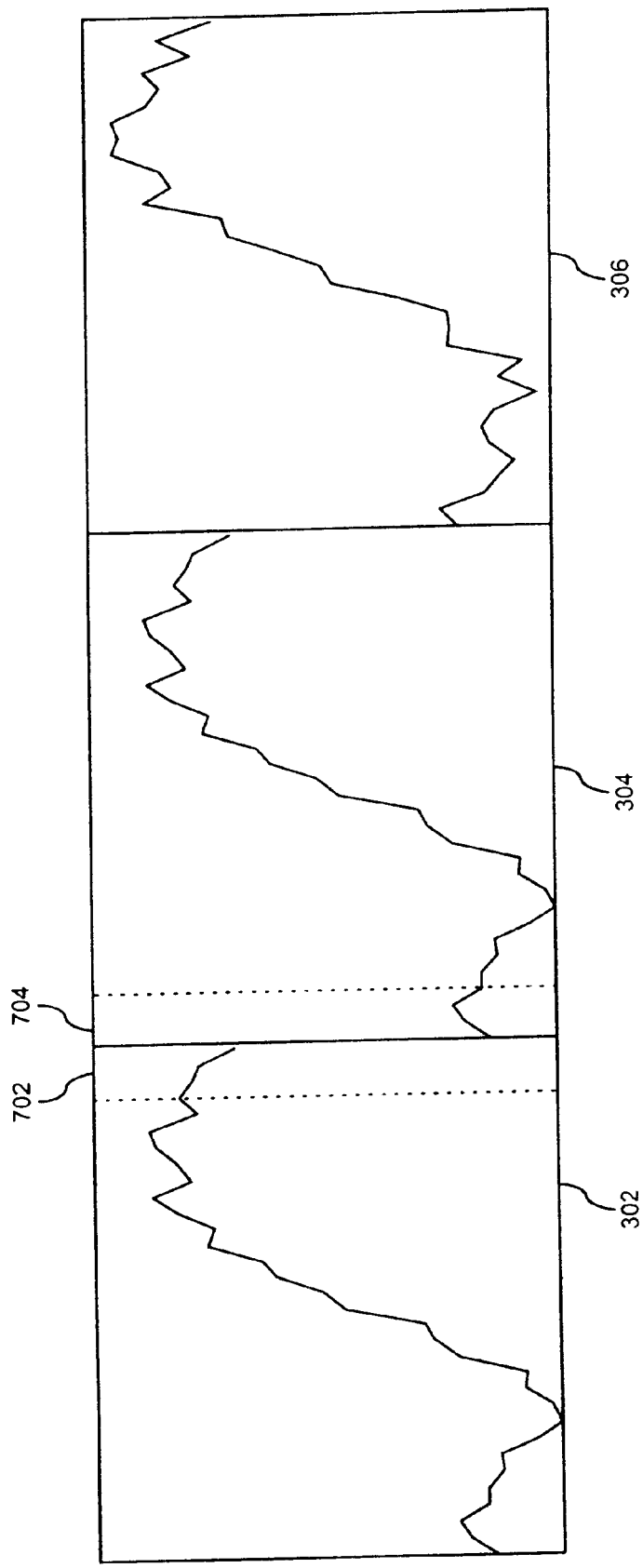
FIGS. 7–9 provide a visual depiction of the process of front substitution.
Figure 8:
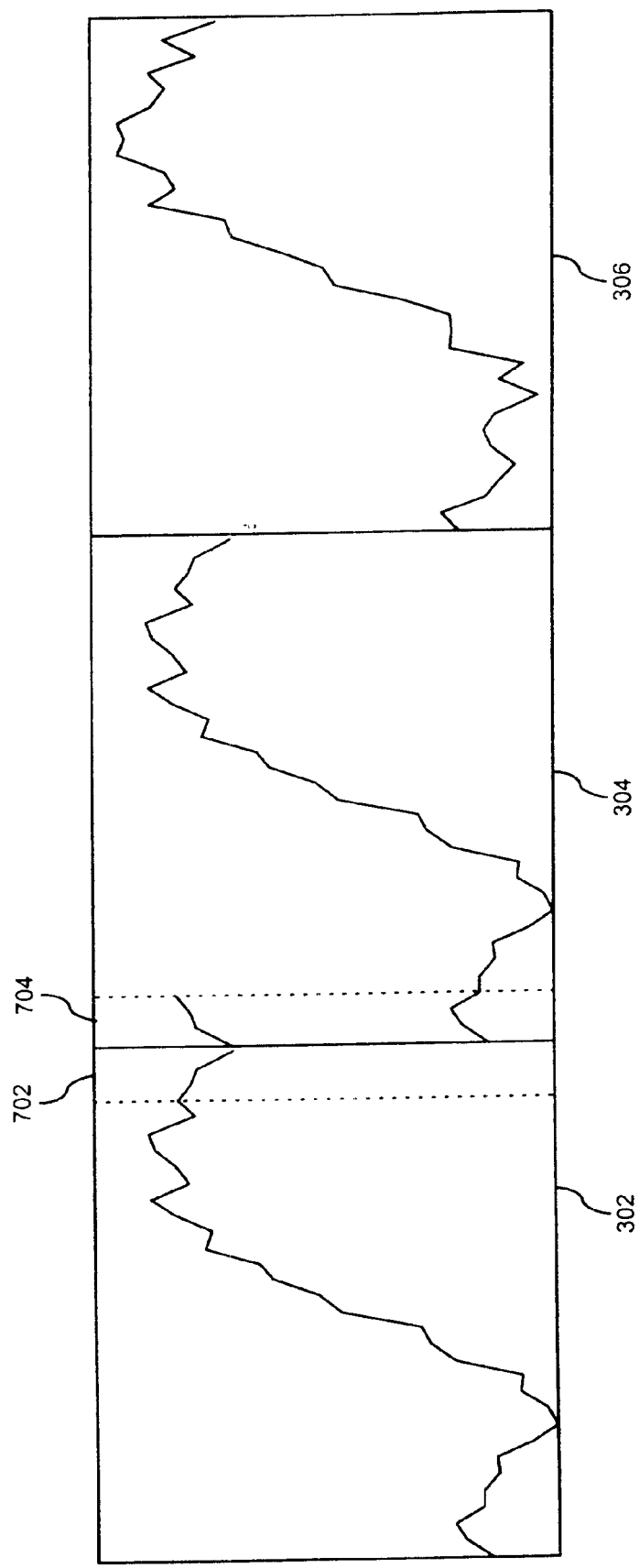
Figure 9:
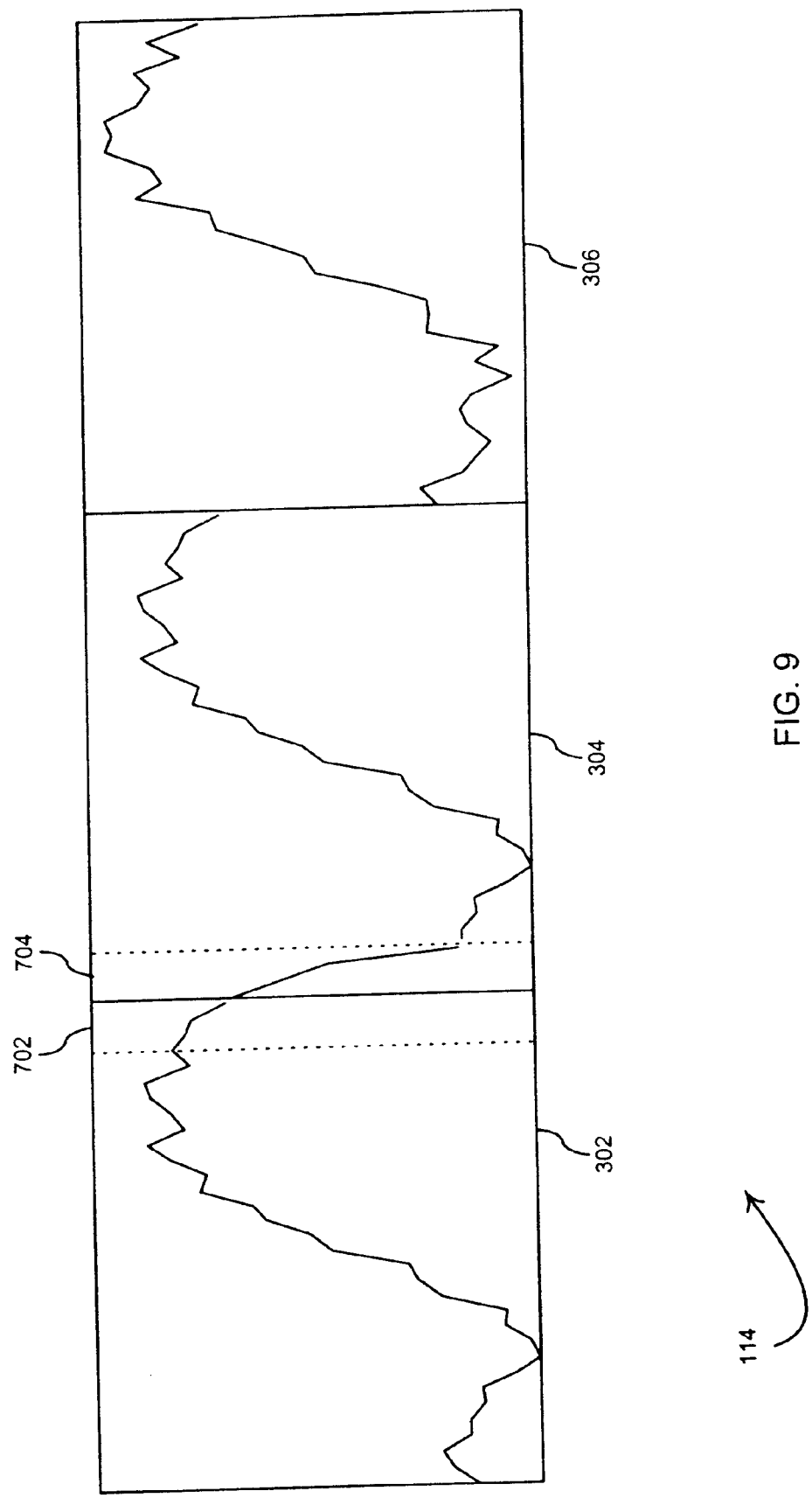

FIG. 6 is a flowchart depicting the operation of the present invention in executing front substitution. FIGS. 7–9 provide a visual depiction of the process.

In FIG. 7, the packet repeating method is first used to fill-in for the lost packet. Zero-stuffing or any other method may be used. The packet repeating method is desirable because it is a reasonable guess at the frequency content of the missing packet, and won't leave an audible gap.

Call the packet to be replaced P, and the previous packet is $P^{-1}$. Write $P_{1:i}$ for the first i samples of P, and $P^{-1}_{N-i+1:N}$ for the last i samples of $P^{-1}$, where N is the number of samples in a packet. Write $P^{-1}_{N:N-i+1}$ to indicate that the order of the samples in the $P^{-1}_{N-i+1:N}$ is reversed. The first i packets of P are replaced with a weighted average of $P_{1:i}$ and $P^{-1}_{N:N-i+1}$ (FIG. 4c). In this example, weights are given by the linear function W=[0.5, 1.5, ..., i-0.5]/i. We replace the initial segment of the packet P by the expression $$P_{1:i} = W*P_{1:i} + (1-W)*P^{-1}_{N:N-i+1}. \quad (1)$$

Equation 1 can be understood in terms of a visual description. Referring to FIG. 7, a lost packet is to be replaced. The goal is to fill the missing area with samples that estimate the content of the missing packet, as well as to obtain a smooth transition between the end of the previous packet and the beginning of the next. Referring to FIG. 6, a fill packet is generated at 602. In a preferred embodiment, packet repetition is used to fill in for missing packet 304, with the assumption that this will approximate, in a very rough sense, the content of the missing packet. This assumption is supported by the observation that the frequency content of voice signals tends to vary somewhat slowly over time, relative to the size of the packet.

Referring to FIG. 5, notice in that the beginning of the replaced packet 304 is not aligned with the ending of the previous packet 302. To compensate for this, referring to FIG. 7, an adjacent portion 702 of previous packet 302 is selected at 604. An adjacent portion 704 of the fill packet 304 is also selected at 606. In a preferred embodiment, selected portions 702 and 704 contain the same number of samples and each portion contains about ⅛ of the samples present in a packet.

Referring now to FIG. 8, selected portion 702 is reflected at 608 (that is, the time order of its samples is reversed). Next, a weighted average of corresponding samples within selected portion 704 and the reflection of selected portion 702 is generated at 610. This allows, for example, for the first 1 msec of a 5 msec replacement packet to ease the transition from one packet to the next. This prevents the abrupt change that often causes an audible click. Different well-known weighting schemes can be used, as discussed in detail below. In general, the reflection of portion 702 is weighted more heavily during the initial part of the average, and portion 704 is weighted more heavily during the final part of the average. The weighted average is then used to replace portion 704 of the fill packet at 612, ensuring a smooth transition between previous packet 302 and the replacement packet, as shown at 704 in FIG. 9.

Back Substitution

Back substitution is very similar to Front Substitution. The primary difference is that back substitution makes use of the packet following the lost packet, and smoothes the transition between the end of the replaced packet and the following packet. Computationally, $P_{N-i+1:N}$ is written for the last i samples of packet P, and $P^{+1}_{1:i}$ is written for the first i samples of the packet following P. Write $P^{+1}_{1:i}$ to indicate that the order of the samples in $P^{+1}_{1:i}$ is reversed. Using W from above, the last i samples of P would be replaced by the expression $$P_{N-i+1:N} = W*P_{N-i+1:N} + (1-W)*P^{+1}_{i:1i}. \quad (2)$$

Similar to front substitution, back substitution uses a weighted average to smoothly transit from the lost packet to the new packet.

Figure 10:
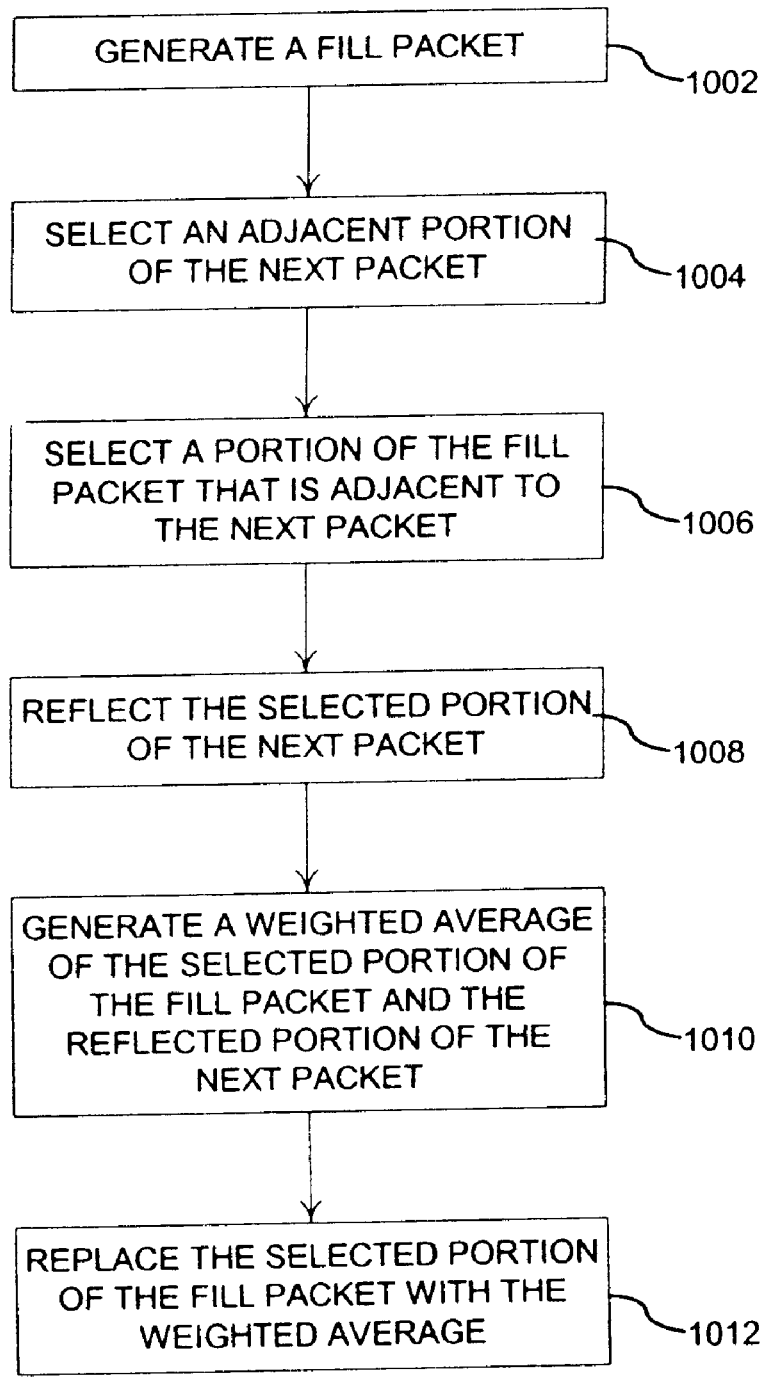
FIG. 10 is a flowchart depicting the operation of the present invention in executing back substitution.
Figure 11:
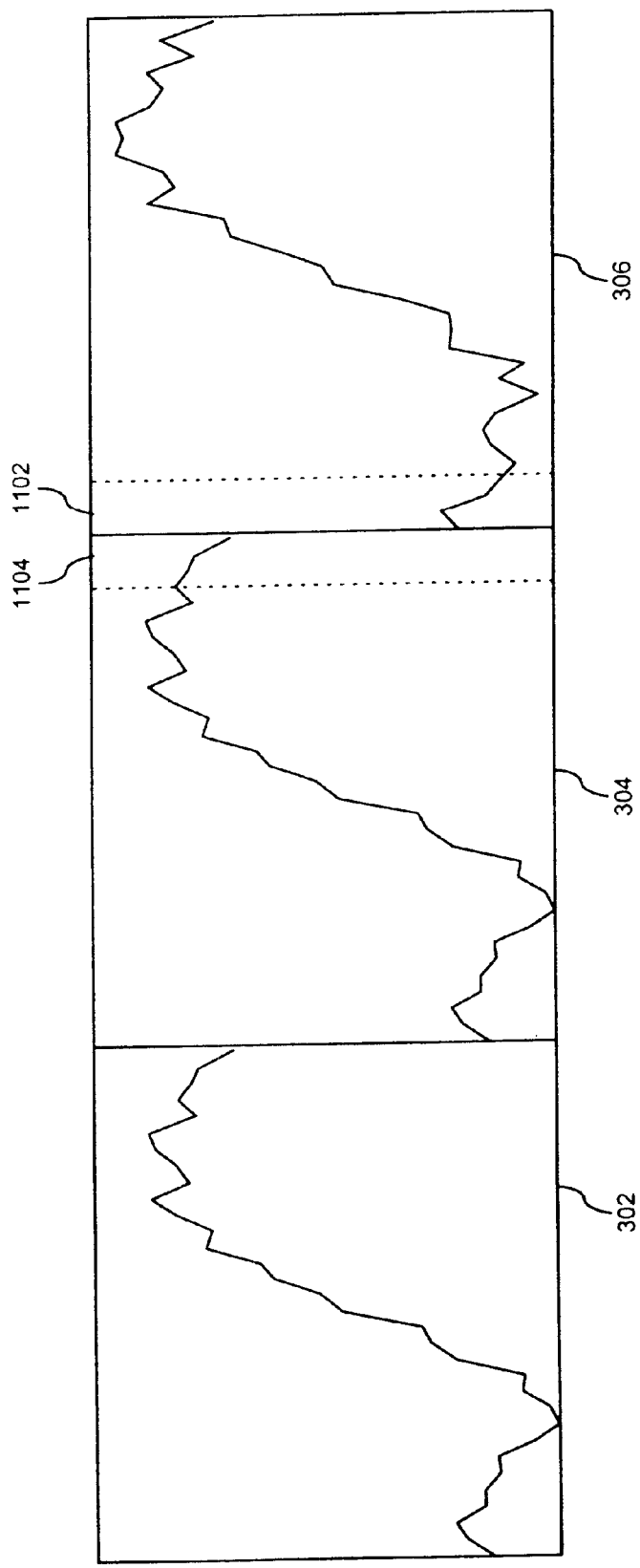
FIGS. 11–13 provide a visual depiction of the process of back substitution.
Figure 12:
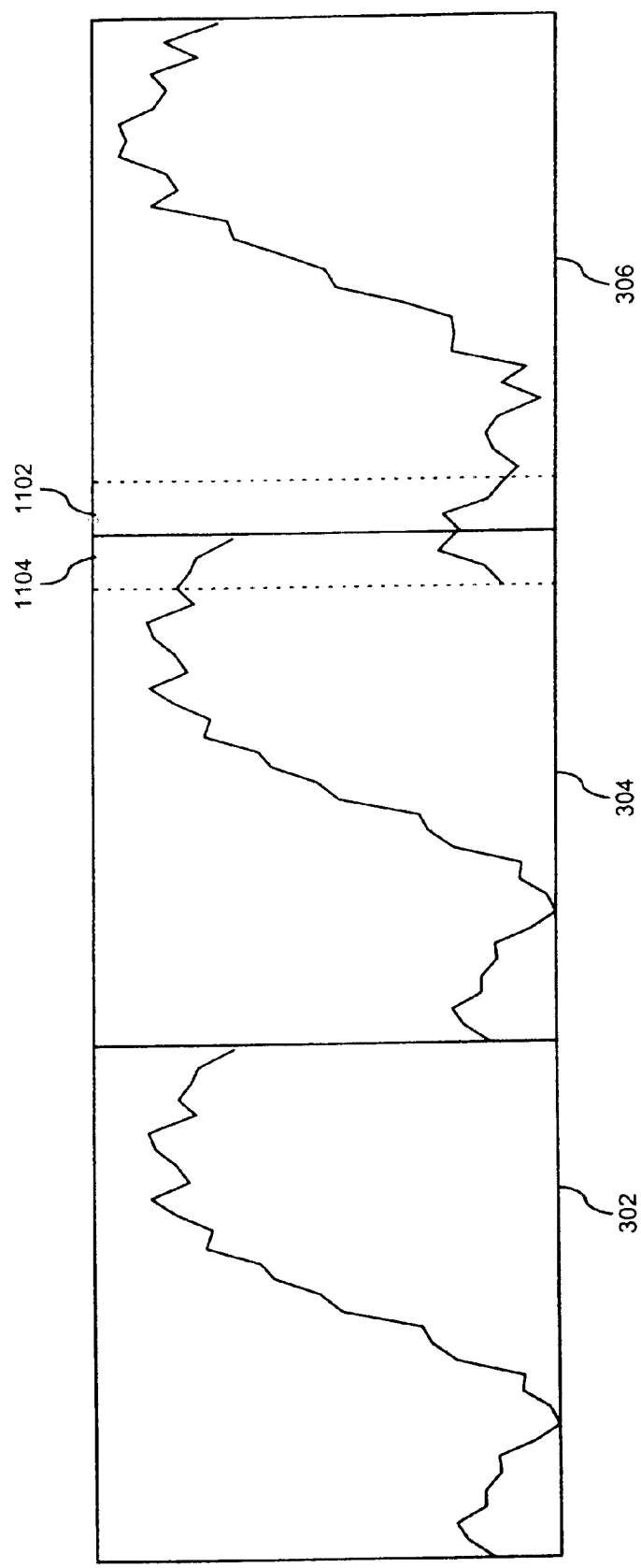
Figure 13:
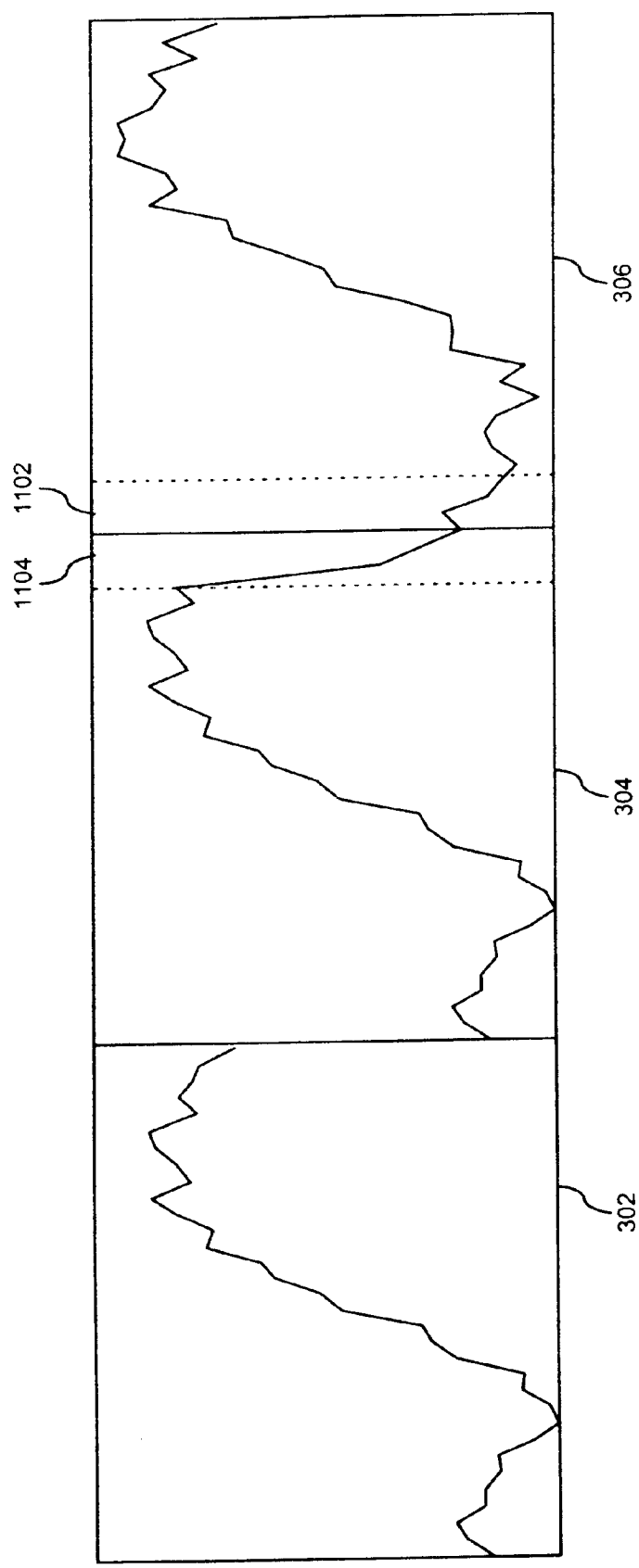

Equation 2 can be understood in terms of a visual description. FIG. 10 is a flowchart depicting the operation of the present invention in executing back substitution. FIGS. 11–13 provide a visual depiction of the process.

Referring to FIG. 11, a lost packet is to be replaced. The goal is to fill the missing area with samples that estimate the content of the missing packet, as well as to obtain a smooth transition between the end of the previous packet and the beginning of the next. Referring to FIG. 10, a fill packet is generated at 1002. In a preferred embodiment, packet repetition is used to fill in for missing packet 304.

Referring to FIG. 5, notice that the end of fill packet 304 is not aligned with the beginning of the next packet 306. To compensate for this, referring to FIG. 11, an adjacent portion 1102 of next packet 306 is selected at 1004. An adjacent portion 1104 of the fill packet 304 is also selected at 1006. In a preferred embodiment, selected portions 1102 and 1104 contain the same number of samples.

Referring now to FIG. 12, selected portion 1102 is reflected at 1008 (that is, the time order of its samples is reversed). Next, a weighted average of corresponding samples within selected portion 1104 and the reflection of selected portion 1102 is generated at 1010. This allows, for example, for the last 1 msec of a 5 msec replacement packet to ease the transition from one packet to the next. This prevents the abrupt change that often causes an audible click. Different well-known weighting schemes can be used, as discussed in detail below. In general, the reflection of portion 1102 is weighted more heavily during the final part of the average, and portion 1104 is weighted more heavily during the initial part of the average. The weighted average is then used to replace portion 1104 of the fill packet at 1012, ensuring a smooth transition between the replacement packet and the next packet 306, as shown at 1104 in FIG. 13.

Post-front Substitution

Requiring that a system be able to compute back substitution based on the following packet may be prohibitive, since an additional delay may be incurred by waiting for the next packet, and the packet must be read into memory before something can be played out for the missing packet. A failure to perform back substitution will mean that the replacement packet will not align with the packet following it, yielding an audible click. To address this, the present invention provides a process referred to herein as "post-front substitution."

In post-front substitution, front-substitution is applied to the packet 306 following lost packet 304, even though packet 306 may very well be available for playback. In other words, the initial portion of the packet 306 following lost packet 403 would be replaced using front-substitution as if packet 306 were missing. Even though packet 306 is received intact, the process changes a part of the contents of packet 306 in order to align it better with missing packet 304.

Figure 14:
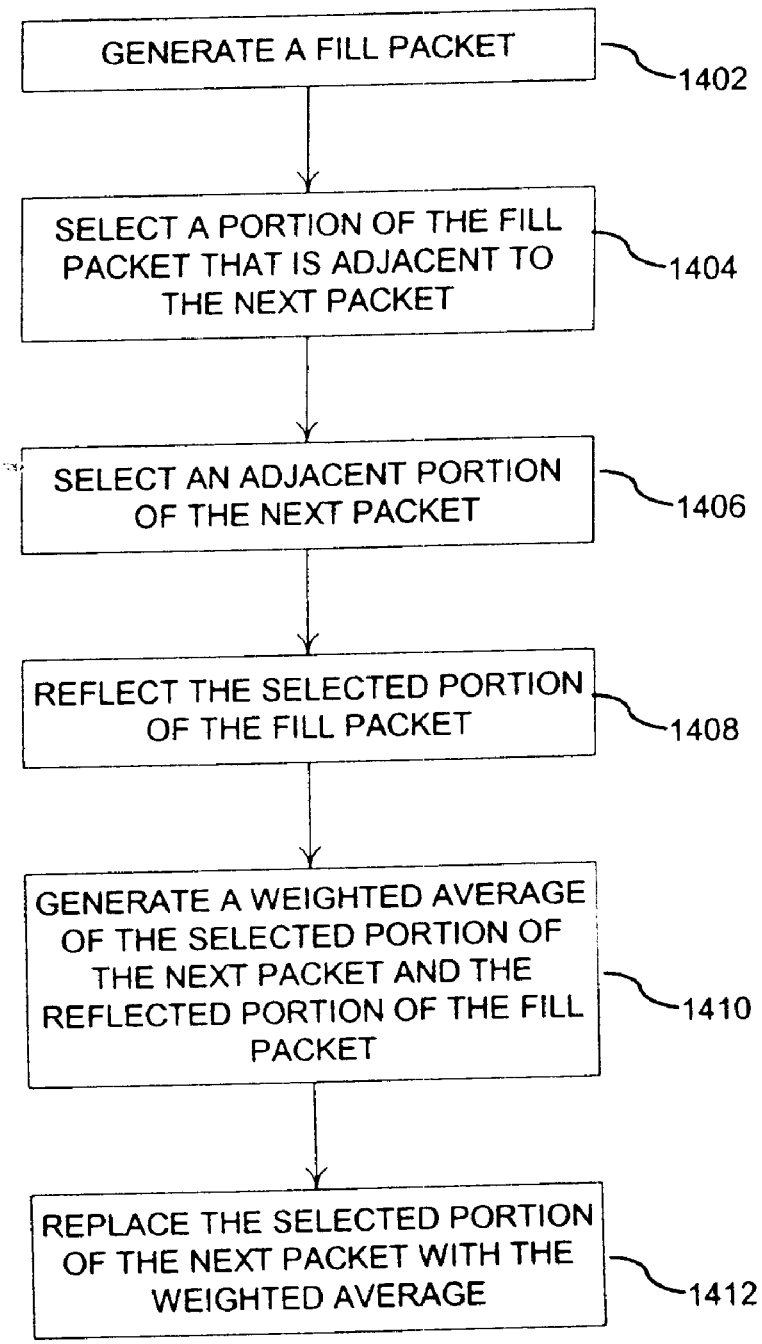
FIG. 14 is a flowchart depicting the operation of the present invention in executing post-front substitution.
Figure 15:
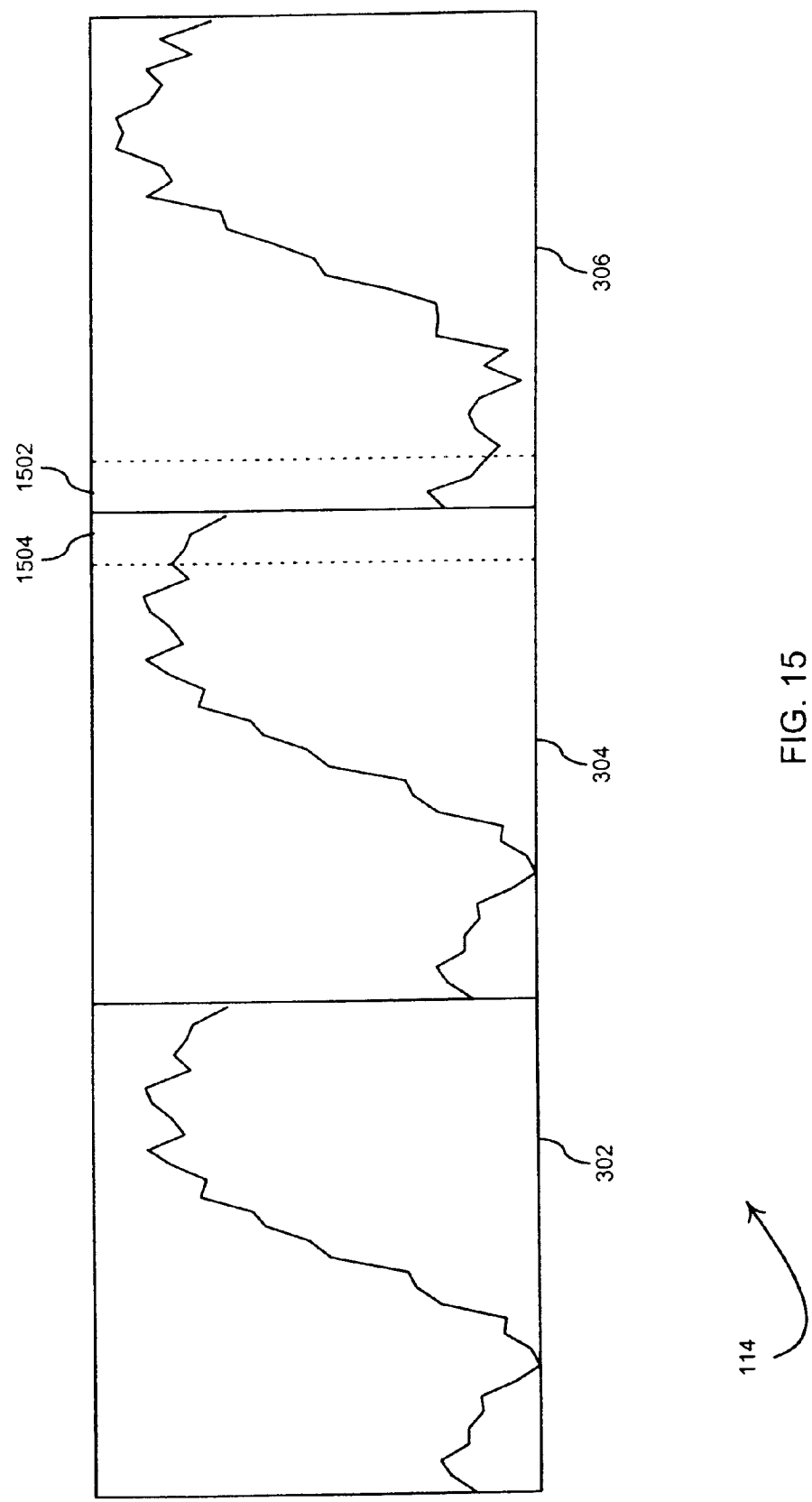
FIGS. 15–17 provide a visual depiction of the process of post-front substitution.
Figure 16:
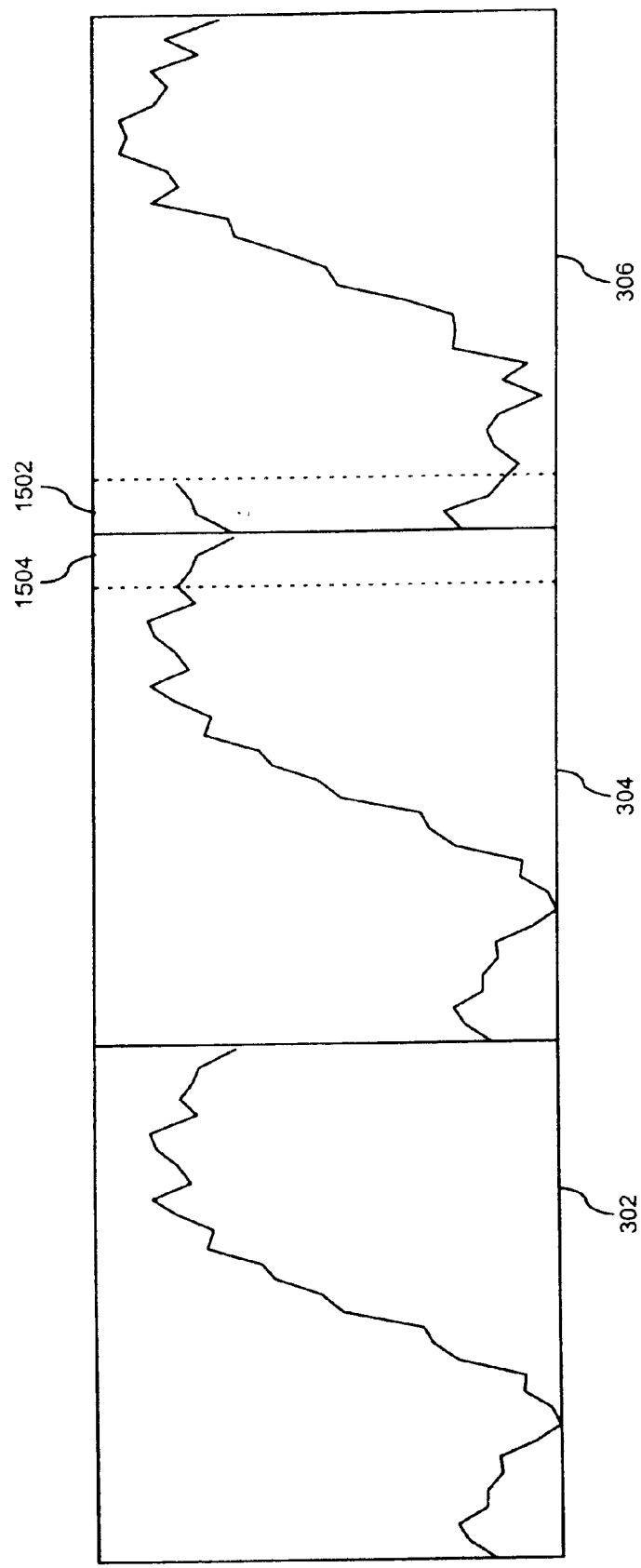
Figure 17:
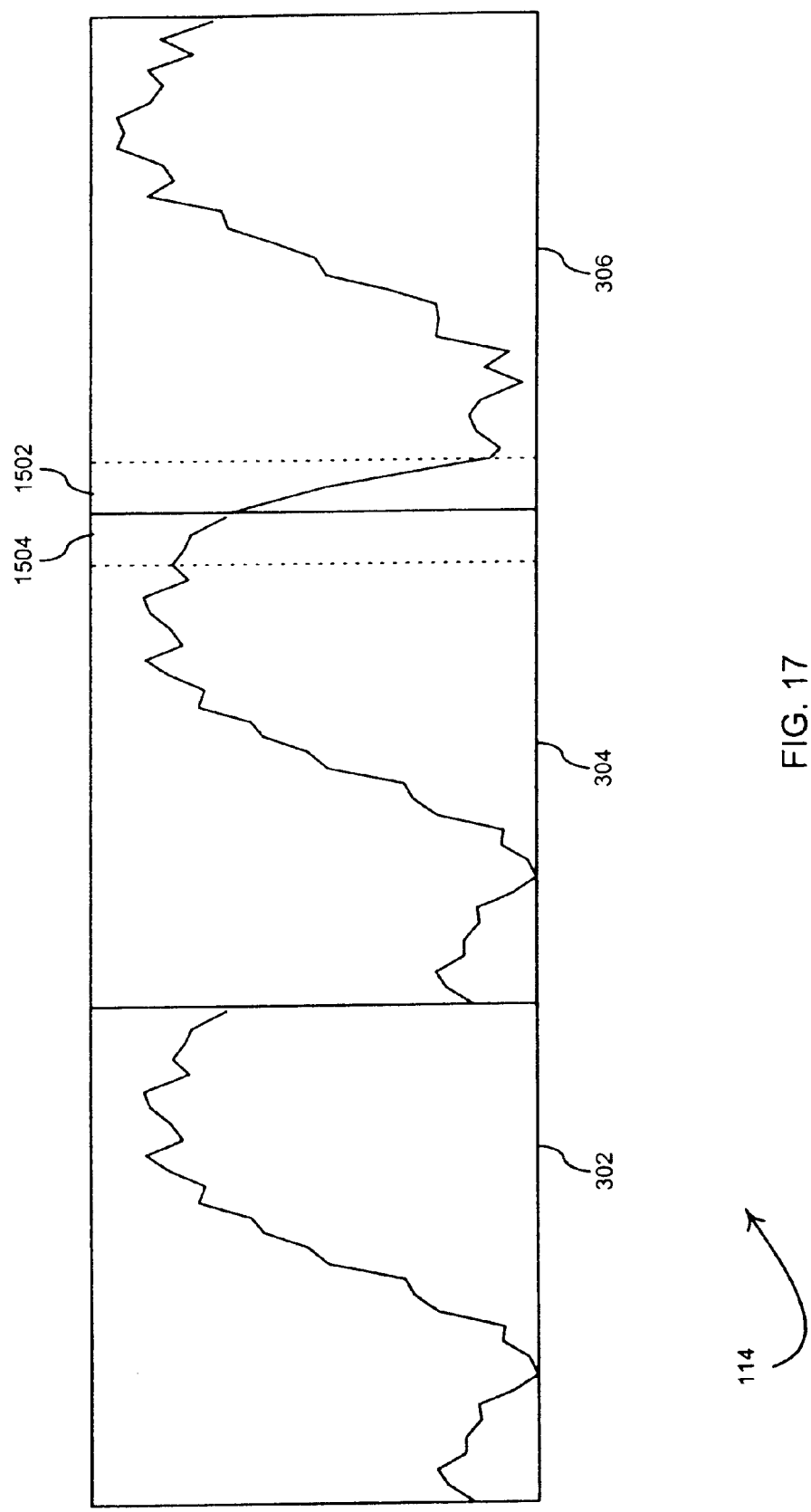

FIG. 14 is a flowchart depicting the operation of the present invention in executing post-front substitution. FIGS. 15–17 provide a visual depiction of the process.

Referring to FIG. 15, a lost packet 304 is to be replaced. The goal is to fill the missing area with samples that estimate the content of the missing packet, as well as to obtain a smooth transition between the end of lost packet 304 and the beginning of the next packet 306. Referring to FIG. 14, a fill packet is generated at 1402. In a preferred embodiment, packet repetition is used to fill in for missing packet 304.

Referring to FIG. 5, notice that the end of fill packet 304 is not aligned with the beginning of the next packet 306. To compensate for this, referring to FIG. 15, an adjacent portion 1502 of next packet 306 is selected at 1404. An adjacent portion 1504 of the fill packet 304 is also selected at 1406. In a preferred embodiment, selected portions 1502 and 1504 contain the same number of samples.

Referring now to FIG. 16, selected portion 1504 is reflected at 1408 (that is, the time order of its samples is reversed). Next, a weighted average of corresponding samples within selected portion 1502 and the reflection of selected portion 1504 is generated at 1410. This allows, for example, for the last 1 msec of a 5 msec replacement packet to ease the transition from one packet to the next. This prevents the abrupt change that often causes an audible click. Different well-known weighting schemes can be used, as discussed in detail below. In general, the reflection of portion 1502 is weighted more heavily during the initial part of the average, and portion 1504 is weighted more heavily during the final part of the average. The weighted average is then used to replace portion 1502 of next packet 306 at 1412, ensuring a smooth transition between the replacement packet and the next packet 3014, as shown at 1504 in FIG. 17.

Post-back Substitution

The present invention provides a further process referred to herein as "post-back substitution." Post-back substitution moves the audio distortions introduced by the replacement technique further away from the lost packet itself. Since these distortions occur at the beginning and end of the packet being replaced, in certain cases perceived audio quality is improved by shifting these distortions as far apart as possible. This technique is useful for small packet sizes where the distortions at the beginning and end of the packet occur within several milliseconds of each other.

In post-back substitution, back-substitution is applied to the packet 302 preceding lost packet 304, even though packet 302 may very well be available for playback. In other words, the final portion of packet 302 is replaced using back-substitution as if packet 302 were missing. Even though packet 302 is received intact, the process changes a part of the contents of packet 302 in order to align it better with missing packet 304.

Figure 18:
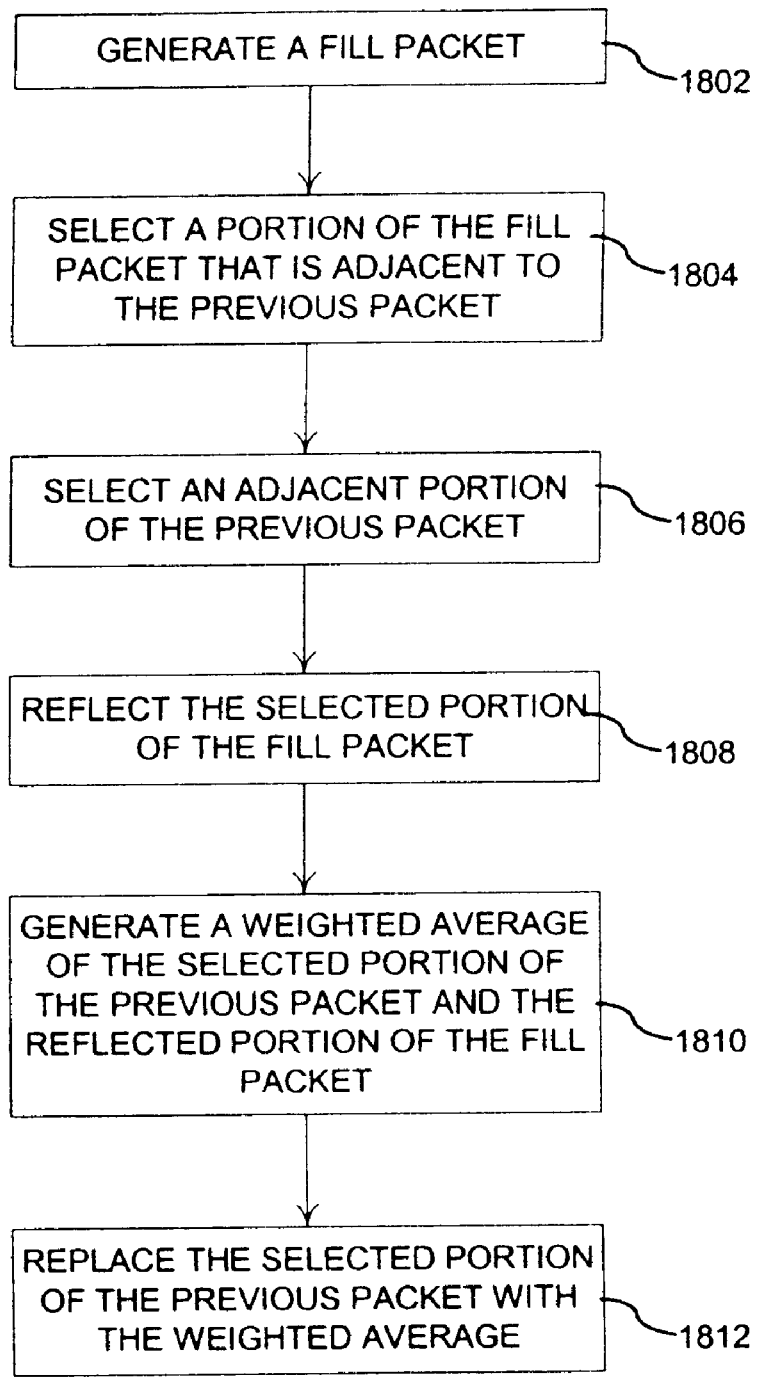
FIG. 18 is a flowchart depicting the operation of the present invention in executing post-front substitution.
Figure 19:
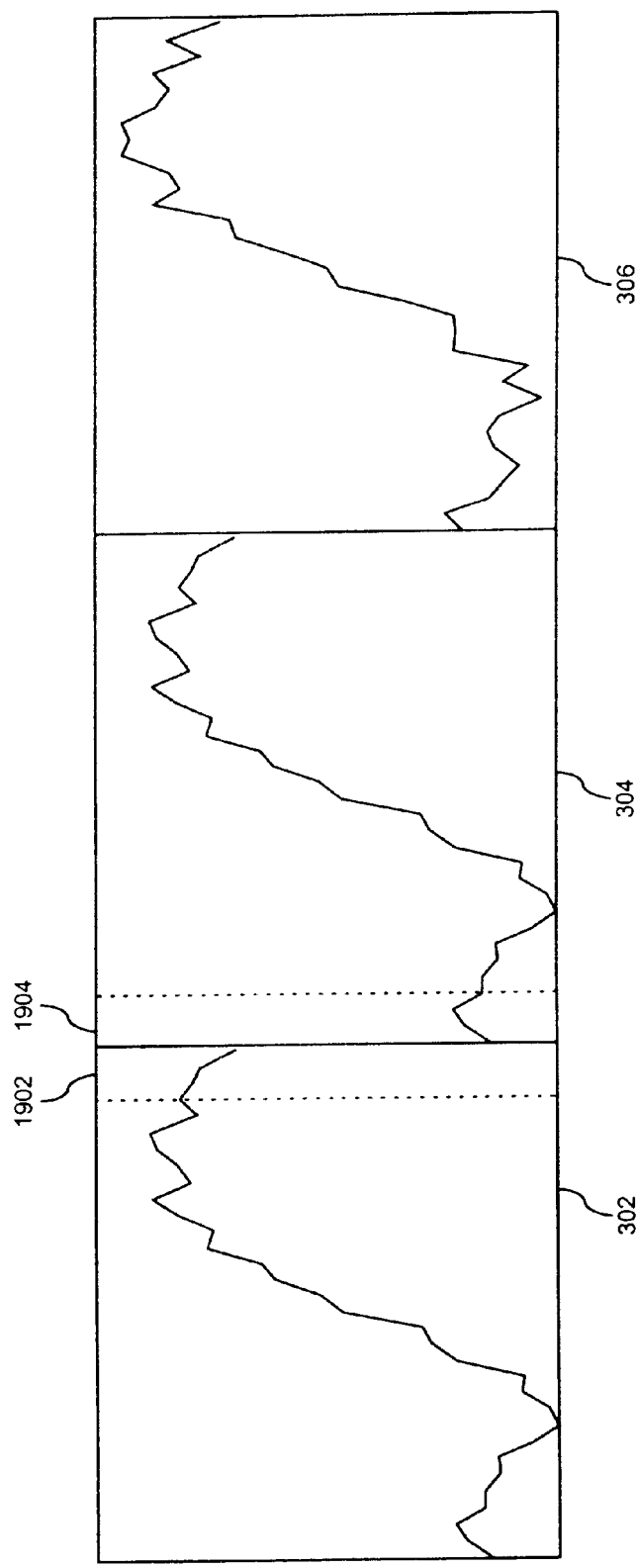
FIGS. 19–21 provide a visual depiction of the process of post-front substitution.
Figure 20:
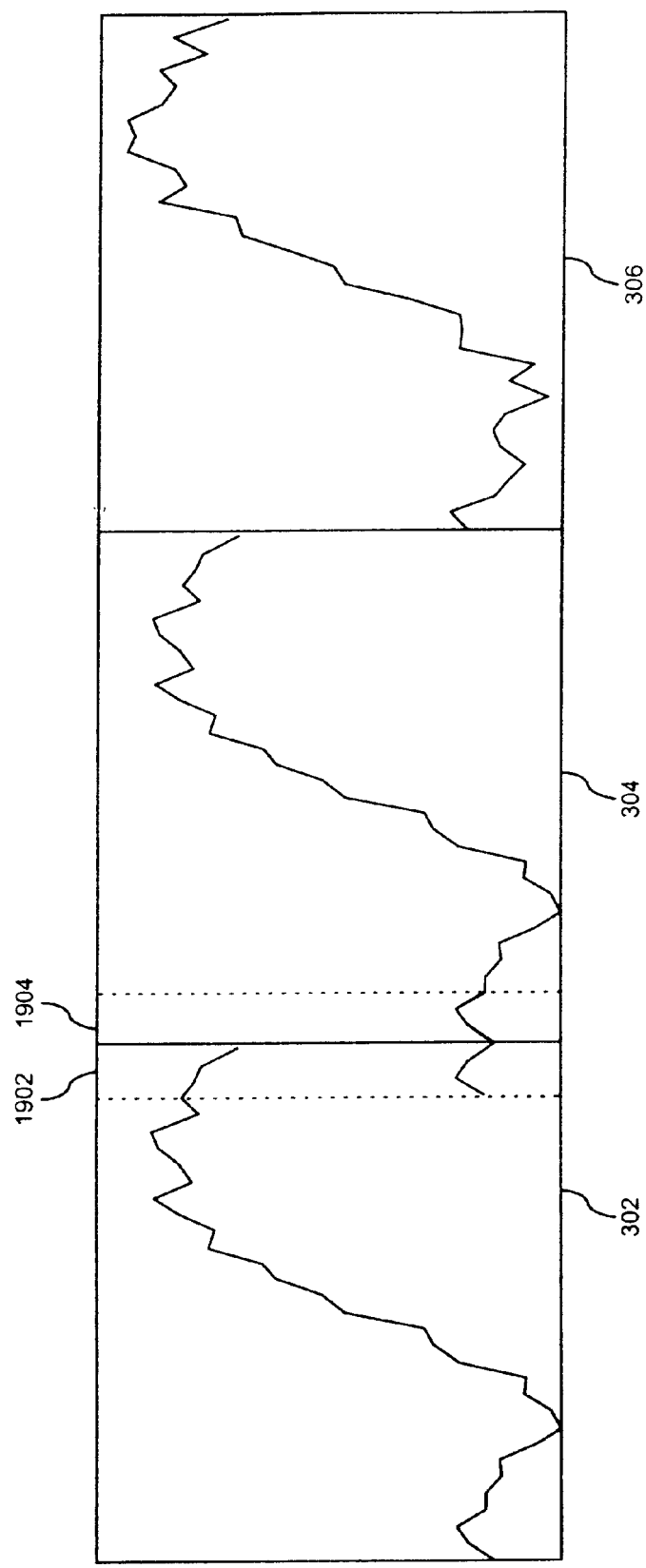
Figure 21:
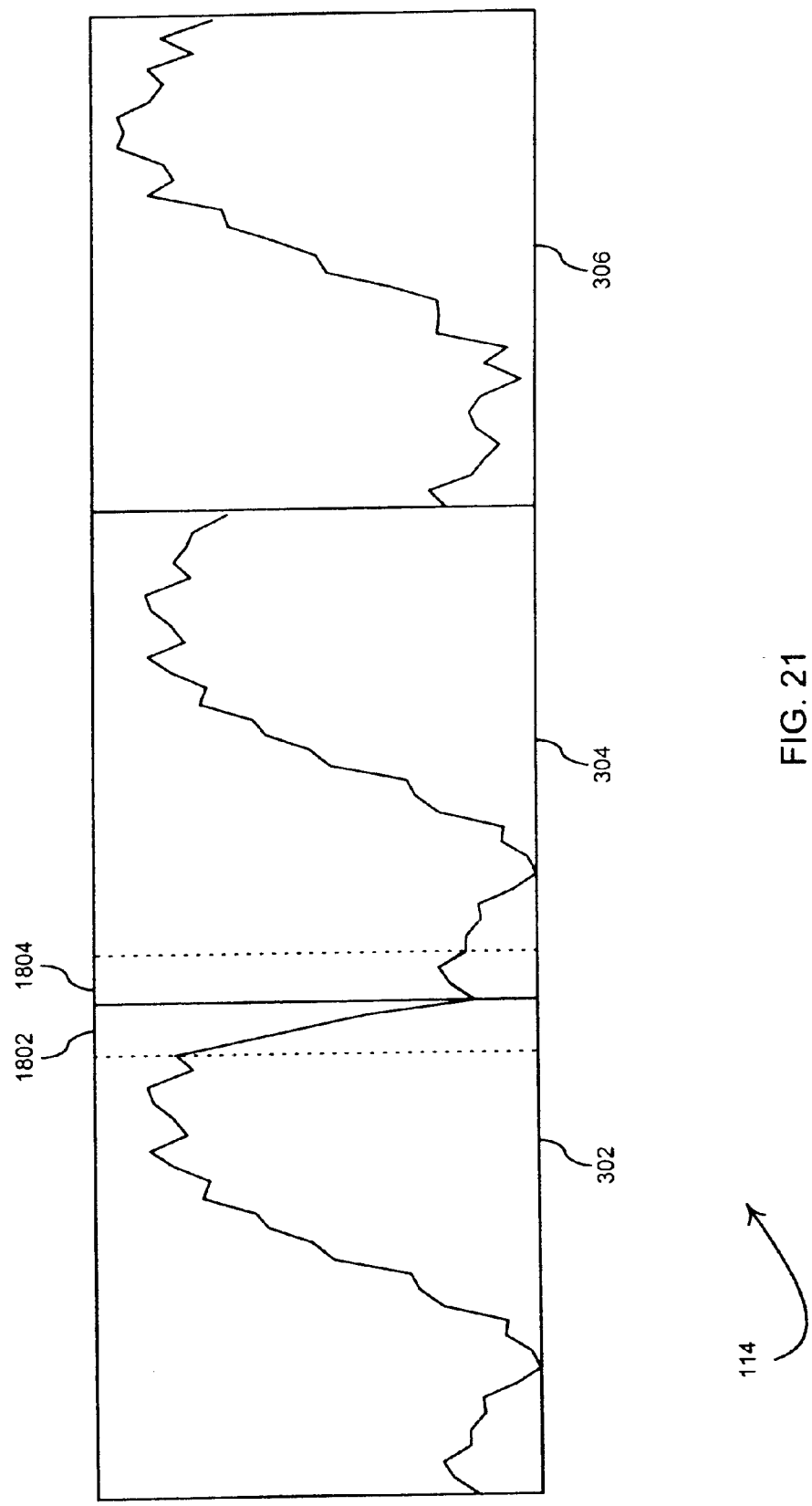

FIG. 18 is a flowchart depicting the operation of the present invention in executing post-front substitution. FIGS. 19–21 provide a visual depiction of the process.

Referring to FIG. 19, a lost packet 304 is to be replaced. The goal is to fill the missing area with samples that estimate the content of the missing packet, as well as to obtain a smooth transition between the end of previous packet 302 and the end of lost packet 304. Referring to FIG. 18, a fill packet is generated at 1802. In a preferred embodiment, packet repetition is used to fill in for missing packet 304.

Referring to FIG. 5 , notice that the beginning of fill packet 304 is not aligned with the ending of the previous packet 302. To compensate for this, referring to FIG. 19, an adjacent portion 1902 of previous packet 302 is selected at 1804. An adjacent portion 1904 of the fill packet 304 is also selected at 1806. In a preferred embodiment, selected portions 1902 and 1904 contain the same number of samples.

Referring now to FIG. 20, selected portion 1904 is reflected at 1808 (that is, the time order of its samples is reversed). Next, a weighted average of corresponding samples within selected portion 1902 and the reflection of selected portion 1904 is generated at 1810. This allows, for example, for the first 1 msec of a 5 msec replacement packet to ease the transition from one packet to the next. This prevents the abrupt change that often causes an audible click. Different well-known weighting schemes can be used, as discussed in detail below. In general, the reflection of portion 1904 is weighted more heavily during the final part of the average, and portion 1902 is weighted more heavily during the initial part of the average. The weighted average is then used to replace portion 1902 of previous packet 302 at 1812, ensuring a smooth transition between previous packet 302 and the replacement packet, as shown at 1904 in FIG. 21.

Weighting Schemes

In a preferred embodiment, a linear weight vector W is used for calculating the weighted average between corresponding samples in the selected portions of adjacent voice packets described above. That is, a graph of the weights would be a straight line. The use of linear weight vectors is well-known in the relevant arts. Other weight vectors can be used with the present invention. For example, weights may be given by a cumulative probability density function, including the cumulative normal, Weibull, Cauchy, or SDE, or any S-shaped curve, such as a portion of a sine wave. Since these weights can be stored in memory at development time, the complexity of calculating the weights will not effect real-time execution.

Figure 3:
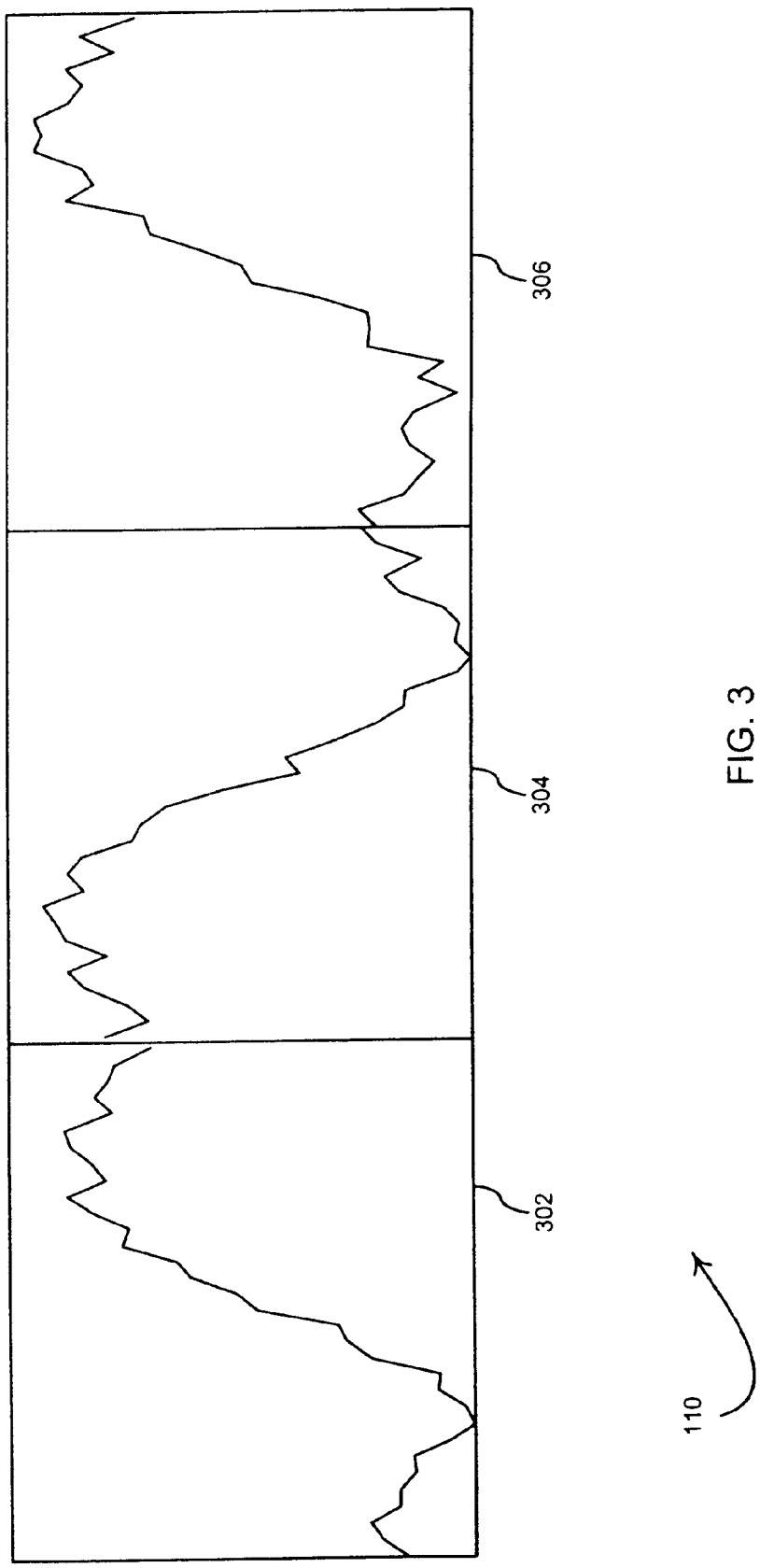
FIG. 3 depicts a voice signal that has been digitized and coded as samples which are grouped into three sequential packets

The processes described above can be used singly or in combinations. FIG. 22 depicts a signal 114 where a lost packet 304 has been modified using packet replacement and front and back substitution. Although the restored waveform 114 does not exactly match the original waveform 110 of FIG. 3, in which all three packets are present, waveform 114 is continuous and smooth, and will not noticeably affect the quality of the voice signal.

CONCLUSION

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for replacing a lost packet in a sequence of packets, each packet including samples of a signal, the apparatus comprising:

means for generating a fill packet;

means for selecting from a packet that is adjacent to the lost packet a portion that is adjacent to the lost packet;

means for selecting from the fill packet a portion that is adjacent to the adjacent packet; and means for replacing the selected portion of the fill packet with a weighted average of the selected portion of the fill packet and a reflection of the selected portion of the adjacent packet.

2. The apparatus of claim 1, wherein the adjacent packet precedes the lost packet.

3. The apparatus of claim 1, wherein the adjacent packet follows the lost packet.

4. The apparatus of claim 1, wherein the weighting is according to a linear function.

5. The apparatus of claim 1, wherein the weighting is according to a cumulative probability density function.

6. An apparatus for replacing a lost packet in a sequence of packets, each packet including samples of a signal, the apparatus comprising:

means for generating a fill packet;

means for selecting from a packet that is adjacent to the lost packet a portion that is adjacent to the lost packet;

means for selecting from the fill packet a portion that is adjacent to the adjacent packet; and means for replacing the selected portion of the adjacent packet with a weighted average of the selected portion of the adjacent packet and a reflection of the selected portion of the fill packet.

7. The apparatus of claim 6, wherein the adjacent packet precedes the lost packet.

8. The apparatus of claim 6, wherein the adjacent packet follows the lost packet.

9. The apparatus of claim 6, wherein the weighting is according to a linear function.

10. The apparatus of claim 6, wherein the weighting is according to a cumulative probability density function.

11. A method for replacing a lost packet in a sequence of packets, each packet including samples of a signal, the method comprising:

generating a fill packet;

selecting from a packet that is adjacent to the lost packet a portion that is adjacent to the lost packet;

selecting from the fill packet a portion that is adjacent to the adjacent packet; and replacing the selected portion of the fill packet with a weighted average of the selected portion of the fill packet and a reflection of the selected portion of the adjacent packet.

12. The method of claim 11, wherein the adjacent packet precedes the lost packet.

13. The method of claim 11, wherein the adjacent packet follows the lost packet.

14. The method of claim 11, wherein the weighting is according to a linear function.

15. The method of claim 11, wherein the weighting is according to a cumulative probability density function.

16. A method for replacing a lost packet in a sequence of packets, each packet including samples of a signal, the method comprising:

generating a fill packet;

selecting from a packet that is adjacent to the lost packet a portion that is adjacent to the lost packet;

selecting from the fill packet a portion that is adjacent to the adjacent packet; and replacing the selected portion of the adjacent packet with a weighted average of the selected portion of the adjacent packet and a reflection of the selected portion of the fill packet.

17. The method of claim 16, wherein the adjacent packet precedes the lost packet.

18. The method of claim 16, wherein the adjacent packet follows the lost packet.

19. The method of claim 16, wherein the weighting is according to a linear function.

20. The method of claim 16, wherein the weighting is according to a cumulative probability density function.

21. A computer program product comprising a computer usable medium having computer readable program code means embodied in said computer usable medium for replacing a lost packet in a sequence of packets, each packet including samples of a signal, said computer readable program code means comprising:

computer readable program code means for causing a computer to generate a fill packet;

computer readable program code means for causing a computer to select from a packet that is adjacent to the lost packet a portion that is adjacent to the lost packet;

computer readable program code means for causing a computer to select from the fill packet a portion that is adjacent to the adjacent packet; and computer readable program code means for causing a computer to replace the selected portion of the fill packet with a weighted average of the selected portion of the fill packet and a reflection of the selected portion of the adjacent packet.

22. The computer program product of claim 21, wherein the adjacent packet precedes the lost packet.

23. The computer program product of claim 21, wherein the adjacent packet follows the lost packet.

24. The computer program product of claim 21, wherein the weighting is according to a linear function.

25. The computer program product of claim 21, wherein the weighting is according to a cumulative probability density function.

26. A computer program product comprising a computer usable medium having computer readable program code means embodied in said medium for replacing a lost packet in a sequence of packets, each packet including samples of a signal, said computer readable program code means comprising:

computer readable program code means for causing a computer to generate a fill packet;

computer readable program code means for causing a computer to select from a packet that is adjacent to the lost packet a portion that is adjacent to the lost packet;

computer readable program code means for causing a computer to select from the fill packet a portion that is adjacent to the adjacent packet; and computer readable program code means for causing a computer to replace the selected portion of the adjacent packet with a weighted average of the selected portion of the adjacent packet and a reflection of the selected portion of the fill packet.

27. The computer program product of claim 26, wherein the adjacent packet precedes the lost packet.

28. The computer program product of claim 26, wherein the adjacent packet follows the lost packet.

29. The computer program product of claim 26, wherein the weighting is according to a linear function.

30. The computer program product of claim 26, wherein the weighting is according to a cumulative probability density function.

* * * * *